W. W. SPADONE.
CONVEYER BELT.
APPLICATION FILED MAY 10, 1911.
1,009,264.
Patented Nov. 21, 1911.
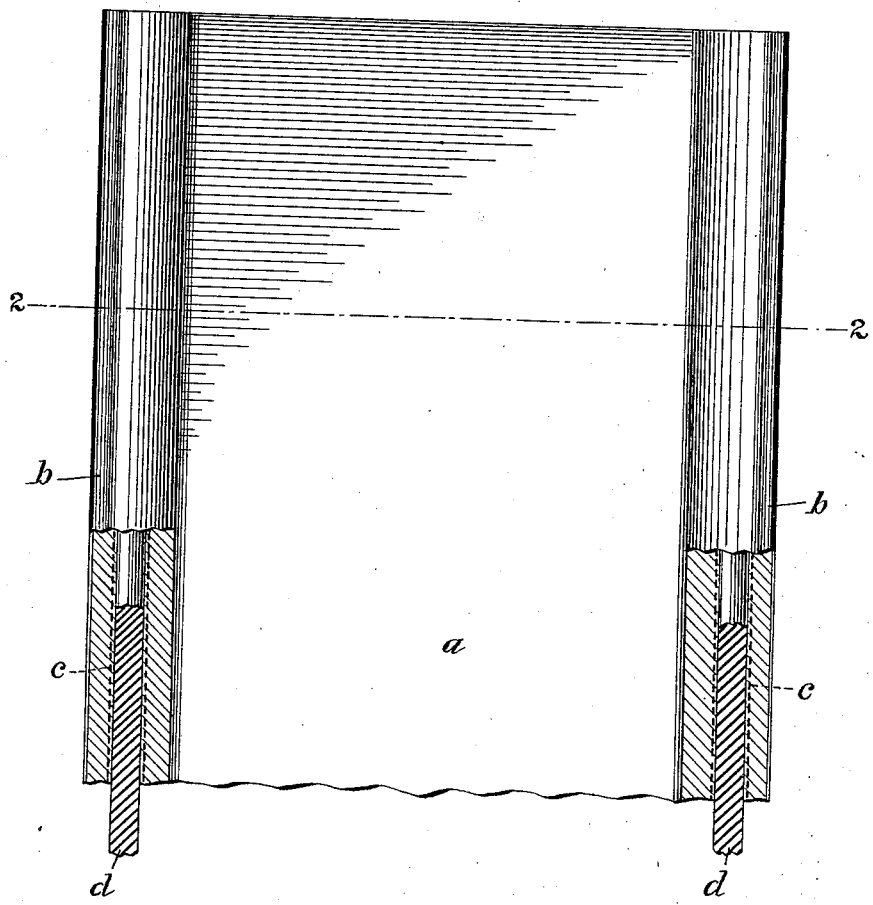
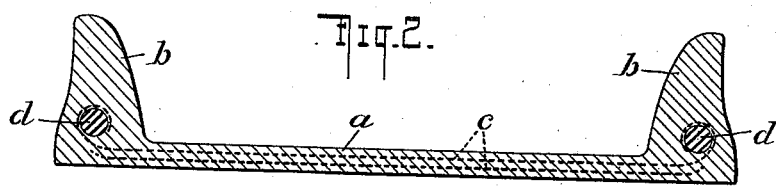
WITNESSES
INVENTOR
Walter W. Spadone
BY
ATTORNEYS

UNITED STATES PATENT OFFICE.

WALTER W. SPADONE, OF NEW YORK, N. Y., ASSIGNOR TO GUTTA PERCHA & RUBBER MANUFACTURING COMPANY, OF NEW YORK, N. Y., A CORPORATION OF NEW YORK.

CONVEYER-BELT.

1,009,264.  Specification of Letters Patent.  Patented Nov. 21, 1911.

Application filed May 10, 1911. Serial No. 626,296.

*To all whom it may concern:*

Be it known that I, WALTER W. SPADONE, a citizen of the United States, and a resident of the borough of Brooklyn, county of Kings, city and State of New York, have invented new and useful Improvements in Conveyer-Belts, of which the following is a specification.

My invention relates to conveyer belts and more particularly to concentrator belts and has for its object to improve and strengthen the construction thereof.

The improvement will be fully described hereinafter and the features of novelty will be pointed out in the appended claims.

Reference is to be had to the accompanying drawings in which—

Figure 1 is a plan view of a portion of a conveyer belt partly in section and Fig. 2 is a cross section thereof on the line 2—2 of Fig. 1.

The belt $a$ is provided with the usual side or longitudinal flanges $b$ at opposite edges and the customary one or more plies of duck or other fabric $c$ embedded in said belt as in existing structures. In manufacturing belts of this kind the flanges $b$ are molded and become part of the belt $a$ by means of vulcanizing in the mold, one of the plies of fabric $c$ being long enough or rather wide enough to have its opposite edges extend into each flange and serve as an additional binding or securing medium to prevent separation of the flanges from the belt. Heretofore it has often been found that the pressure applied to the mold to secure the flanges to the belt combined with the shrinkage of the fabric during the vulcanization process has been sufficient to withdraw either one or both edges of the fabric from the respective flanges so that in the completed belt no portion of the fabric would extend into said flanges. The particular object of my improvement is to overcome this defect and to this end I provide each flange $b$ with a longitudinal core $d$ of rubber or other material incorporated prior to vulcanization. I further make at least one ply of duck or other fabric of a sufficient width to permit its opposite edges to extend about said core $d$. If the belt is now vulcanized these cores $d$ will serve to securely hold the opposite edges of the fabric against displacement and will prevent the said edges from being withdrawn from said flanges. The flanges $b$ in addition to being held in position through being vulcanized to the belt are thus securely maintained in operative and proper relation to said belt by means of this coöperation between the said fabric and said cores. The said cores $d$ are preferably located in each flange at a point above that surface of the belt $a$ which in Fig. 2 is the upper surface and which is always the outer surface of said belt or, in other words, in close proximity to a line representing a transverse continuation of the said outer surface of said belt. The core $d$ also serves to stiffen the belt at its edges so that the flanges $b$ which tend to bend in a direction away from each other as the belt passes over a pulley are more readily and definitely returned to their intended normal position after the belt has passed over said pulley.

This structure is particularly adapted for use in connection with concentration belts owing to its strength. If desired the core $d$ might be made in a contrasting color so that when exposed it would indicate at once the origin or manufacturer of the said belt.

Various changes in the specific form shown and described may be made within the scope of the claims without departing from the spirit of my invention.

I claim:

1. A conveyer belt provided with flanges extending along opposite edges thereof, a ply of fabric extending into said flanges and a core in each flange for securing opposite edges of said fabric in said flanges, each core being located in close proximity to a line representing a transverse continuation of the outer surface of the belt.

2. A conveyer belt provided with flanges extending along opposite edges thereof, a ply of fabric extending into said flanges, and a pliable core extending longitudinally of each flange, said fabric extending about each core and being secured in each flange thereby.

In testimony whereof I have hereunto set my hand in the presence of two subscribing witnesses.

WALTER W. SPADONE.

Witnesses:
 JOHN A. KEHLENBECK,
 M. H. LOCKWOOD.

Copies of this patent may be obtained for five cents each, by addressing the "Commissioner of Patents, Washington, D. C."